(12) United States Patent
Olsson Hopner et al.

(10) Patent No.: US 10,978,264 B2
(45) Date of Patent: Apr. 13, 2021

(54) SINGLE-BODY ACTUATING ARMS WITH A FRICTION-REDUCTION REGION THAT SERVES AS A SLIDING SURFACE

(71) Applicant: WEG EQUIPAMENTOS ELETRICOS S.A., Jaraguá do Sul (BR)

(72) Inventors: Emerson Ricardo Olsson Hopner, Jaragua do Sul (BR); João Gustavo Togneri, Fort Wayne, IN (US)

(73) Assignee: WEG EQUIPAMENTOS ELETRICOS S.A., Jaraguá do Sul (BR)

( * ) Notice: Subject to any disclaimer, the term of this patent is extended or adjusted under 35 U.S.C. 154(b) by 0 days.

(21) Appl. No.: 16/472,698

(22) PCT Filed: Dec. 23, 2016

(86) PCT No.: PCT/BR2016/050344
§ 371 (c)(1),
(2) Date: Jun. 21, 2019

(87) PCT Pub. No.: WO2018/112566
PCT Pub. Date: Jun. 28, 2018

(65) Prior Publication Data
US 2019/0362918 A1 Nov. 28, 2019

(51) Int. Cl.
*H01H 1/18* (2006.01)
*H01H 1/06* (2006.01)
(Continued)

(52) U.S. Cl.
CPC .............. *H01H 35/10* (2013.01); *H01H 1/06* (2013.01); *H01H 1/18* (2013.01); *H01H 1/26* (2013.01); *H02K 1/22* (2013.01)

(58) Field of Classification Search
CPC .. H01H 1/00; H01H 1/06; H01H 1/50; H01H 1/30; H01H 1/18; H01H 2001/265;
(Continued)

(56) References Cited

U.S. PATENT DOCUMENTS

| 4,686,401 | A | * | 8/1987 | Gehrt | ..................... H02K 11/23 200/80 R |
| 5,059,841 | A | * | 10/1991 | Frank | ....................... H01H 9/12 200/293 |
| 6,184,484 | B1 | | 2/2001 | Wade, III | |

FOREIGN PATENT DOCUMENTS

| CN | 1705054 A | 12/2005 |
| CN | 101587794 A | 11/2009 |
| CN | 103036363 A | 4/2013 |

OTHER PUBLICATIONS

International Search Report for International Application No. PCT/BR2016/050344 dated Feb. 13, 2017, 2 pages.

\* cited by examiner

*Primary Examiner* — Vanessa Girardi
(74) *Attorney, Agent, or Firm* — Knobbe, Martens, Olson & Bear LLP

(57) ABSTRACT

The present invention relates to a start switch or contact point (10) for rotating electric machines with single-phase power supply, having a base (100) bearing actuating arms (200) carrying conductive blades (300). The actuating arms (200) are independent and one-piece, each one carrying at least one conductive blade (300) and being pressed against a stop (220) by a resilient element (400), also including a sliding surface (230) with a friction-reduction region (235). The present invention also relates to an electric machine provided with a corresponding start switch or contact point.

2 Claims, 2 Drawing Sheets

(51) Int. Cl.
  *H01H 35/10* (2006.01)
  *H01H 1/26* (2006.01)
  *H02K 1/22* (2006.01)
(58) Field of Classification Search
  CPC ........ H01H 35/10; H02K 11/23; H02K 11/28;
  Y10T 29/49105
  See application file for complete search history.

SINGLE-BODY ACTUATING ARMS WITH A FRICTION-REDUCTION REGION THAT SERVES AS A SLIDING SURFACE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

Field of the Invention

The present invention relates to a start switch for rotating electric machines with single-phase power supply.

BACKGROUND OF THE INVENTION

Start switches (or simply contact points) on rotating electric machines with single-phase power supply function to keep the auxiliary (or start) coil in operation during the electrical machine start procedure, turning off said auxiliary coil as soon as the machine's rotor reaches a certain rotation, typically a rotation in which the motor has reached its optimum torque point, and from which only the main (or work) coil should operate.

The contact point is used with the centrifugal start switch (or simply centrifugal), whereby it acts on the contact points contacts, removing them from their contact position from a given rotation range—typically between 75% and 85% of synchronous motor rotation—interrupting the electrical current supply to the auxiliary coil and thus turning it off.

The contact point's electrical contacts are typically installed in blades made of conductive material bearing at one of its ends and supported on springs that press them back to their closed position as soon as the motor rotation decreases to levels below the aforementioned rotation range, leaving the auxiliary coil ready to perform the electric machine's next start.

Description of the Related Art

Several solutions for contact points used in conjunction with centrifuges in rotating electric machines with single-phase power supply are known in the state of the art.

One example is the centrifugal mechanism to motors disclosed by patenting document CN103036363, describing a centrifuge comprising a central support, a drive disk, a pair of centrifugal counterweights, in which the central support is fixedly connected to a shaft rotation. The drive disk is slidably disposed on the central support in the axial direction, and the centrifugal counterweights are arranged at said drive disk and connected to the sliding block in a combined manner so as to set a stop for the drive disk. Two springs are connected to two centrifugal counterweights ends, respectively. The centrifugal force produced by the centrifugal counterweights exceeds the resistance of the springs, thus allowing the drive disk to slide in the axial direction at the central support as soon as the drive disk reaches a given rotational speed.

The mechanism described by CN103036363 has the disadvantage of having the contacts exposed and as a result, deteriorated in assembly or handling situations and even during operation. It is also noted that positioning of the contacts or dimensional assembly stability are not ensured, which in turn implies in low operation reliability under extreme conditions, both of driving and loading. Moreover, the concept above lacks any device ensuring reduction of friction between the counterweights ends and the rotating part.

Other solutions proposed by the state of the art disclose conjugated mechanisms that repeat, however, the aforementioned problems, also presenting propensity to clumping the electrical contacts in their shutdown position, impairing the contact point and thus preventing the motor from starting and in some conditions burning the coil.

As can be inferred from the above description, there is space and demand for a start switch for rotating electric machines with single-phase power supply, or just contact point, which solves the state of the art problems, providing a switch that is robust and reliable, easy to assemble and handle and for safe continuous operation even under extreme conditions.

SUMMARY OF THE INVENTION

Thus, one of the objectives of the present invention is to provide a start switch according to features of Independent claim 1 from the appended set of claims.

Another objective of the present invention is to provide a rotating electric machine with single-phase power supply according to the features of claim 9 of the appended set of claims.

Other features and details of the features are represented by dependent claims.

BRIEF DESCRIPTION OF THE DRAWINGS

For better understanding and visualization of the object of the present invention, it will now be described with reference to the attached drawings, representing the technical effect obtained via an exemplary embodiment not limiting the scope of the present invention, in that, schematically.

DETAILED DESCRIPTION OF THE PREFERRED EMBODIMENT

Figure 1:
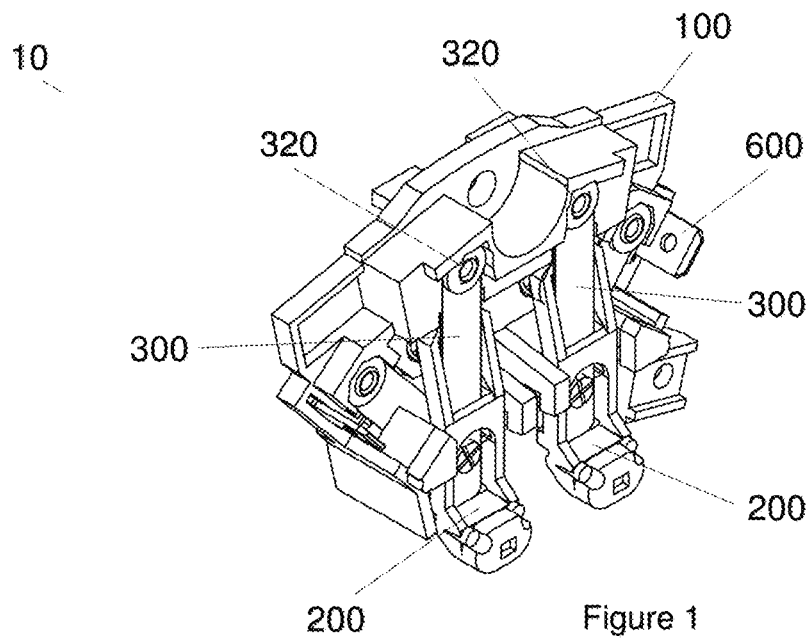
FIG. 1: depicts a perspective view of a contact point according to the invention.
Figure 2:
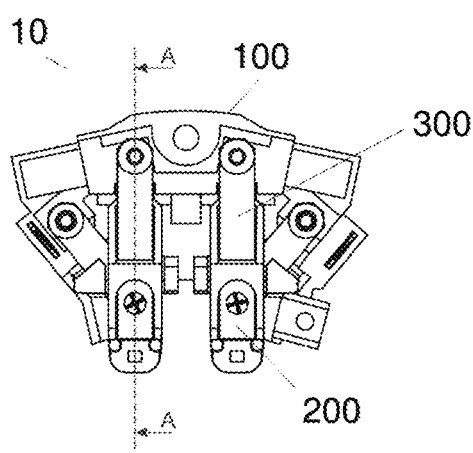
FIG. 2: depicts a front view of a contact point according to the invention.
Figure 3:
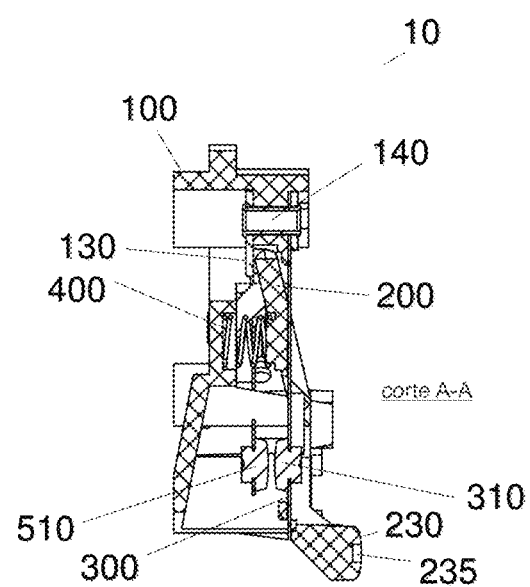
FIG. 3: depicts a side view of the A-A section of FIG. 2.
Figure 4:
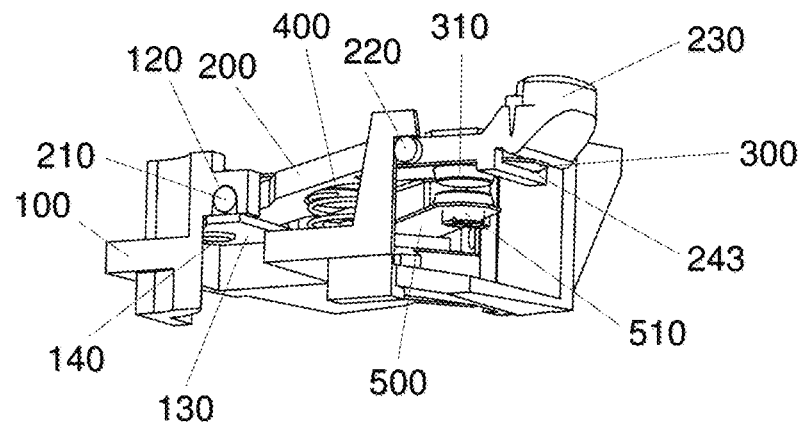
FIG. 4: depicts a partial perspective view of an actuating arm bearing of a contact point according to the invention.
Figure 5:
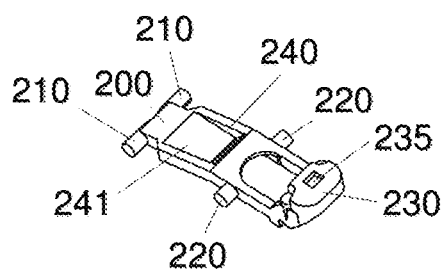
FIG. 5: depicts a perspective view of an actuating arm according to the invention.
Figure 7:
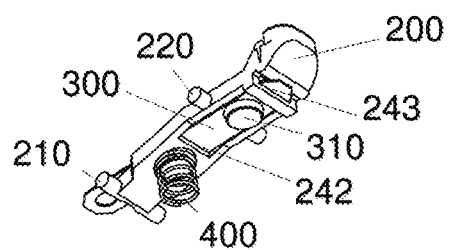
FIG. 7: depicts a perspective view of an actuating arm according to the invention with the conductive blade (300) e the resilient element (400)
Figure 6:
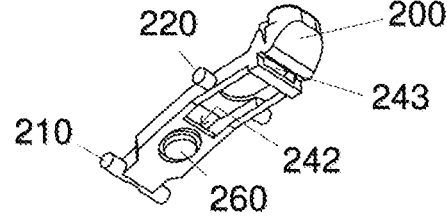
FIG. 6: depicts a perspective view of an actuating arm according to the invention.
Figure 8:
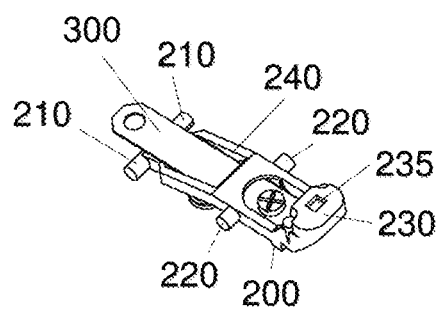
FIG. 8: depicts a perspective view of an actuating arm according to the invention with the conductive blade (300) and the resilient element (400).

The present invention relates to a one-piece start switch or contact point (10) for rotating electric machine with single-phase power supply, and equipped with a base (100) onto which independent actuating arms (200) are mounted, each of said actuating arms (200) housing a conductive blade (300) within.

Each actuating arm (200) consists of a single piece and has two stubs (210) at one of its ends bearing the actuating arm (200) at the base (100) so as to pivot it around the stubs (210). The stubs (210) fit in recesses (120) of the base (100) and are held in said recesses by a contact plate (130) fastened to the base (100) by a fastening element (140) forming a robust and effective bearing.

Between its ends, the actuating arm (200) has two stops (220) which mechanically limit its rotary movement around the stubs (210).

Between the stops (220) and the stubs (210) there is a protrusion (260) in which a resilient element (400) is fitted which holds the actuating arm (200) pressed against the stop (220) and always open, likewise pressed against the base (100).

Each actuating arm (200) also has a biased plane (241), a passage gap (242) and an anchoring split (243). Said housing (140) receives at least one conductive blade (300) arranged so as to rest on said biased plane (241), cross the passage gap (242) and fit in the anchoring split (243). Thus, a reliable and robust fastening of the conductive blade (300) on the actuating arm (200) is obtained.

At opposite ends of said stubs (210), each actuating arm (200) has a sliding surface (230) onto which the centrifuge disc slides (not depicted) and presses it against the strength of the resilient element (400), thus pivoting the actuating arm (200) around the stubs (210) in the opposite direction of the stop (220), taking the conductive blade (300) along with it.

Each conductive blade (300) has at least one electrical contact (310) which, when the actuating arm (200) is pressed by the centrifuge, abuts an electrical contact (510) of a lower conductive blade (500) fastened to the base (100), and establishes a connection with the connection terminals (600) of the contact point.

Furthermore, each conductive blade (300) has at least one fastening point (320) at the base (100).

This is how the connection with the auxiliary (or start) coil during the electrical machine starting procedure is established. The connection is held by the centrifugal pressure on the sliding surface (230) until the electrical machine reaches a preset rotation in which the centrifugal force causes the centrifugal disc displacement so as to interrupt its mechanical contact with said sliding surface (230). The force of the resilient element (400) presses the actuating arm (200) against the stop (220), thus breaking the electrical connection between the upper conductive blade (300) and the lower conductive blade (500), turning off the auxiliary (or start) coil and moreover avoiding clumping of electrical contacts (310, 510). A simple and effective solution is thus obtained to solve contact clumping problems of the state of the art.

The conductive blade (300) assembly inside the passage gap (242) of the actuating arm (200) provides greater resistance to the contact point (10) against deformations inherent to handling before the motor installation or even by use.

This protection ensures that the conductive blades (300) which support the electrical contacts (310, 510) remain in the appropriate place for a perfect operation of the contact point (10).

The sliding surface (230) of the contact point's actuating arm (200) according to the invention also has a cavity-shaped friction-reduction region (235) in order to receive materials with lower friction coefficient than that of the contacting components or materials reducing the friction coefficient therebetween.

It should be noted that the materials which reduce friction may be parts, inserts, grafts, paints, covers, surface treatments, coatings and the like or lubricants or also any similar materials selected from the group consisting of greases, oils, graphite, Teflon® etc. or a combination thereof.

It is important and indispensable that the materials of this nature are suitable for the intended use, and that they especially do not suffer mechanical, thermal or electrical degradation and do not impair the operation quality neither electrically nor mechanically.

Finally, it should be noted that the solution presented can be used in rotating electric machines with single-phase power supply of different polarities and constructive forms.

CONCLUSION

It will be easily understood by those skilled in the art that changes can be made to the present invention without departing from the concepts exposed in the above description. These changes must be regarded as included in the scope of the present invention. Consequently, the particular embodiments previously described in details are only illustrative and exemplary and are non-restrictive as to the scope of the present invention, to which the full extent of the appended set of claims and any and all correspondents thereof should be given.

What is claimed is:

1. A start switch for single-phase rotary electric machine, equipped with a base (100) onto which actuating arms (200) are mounted, housing conductive blades (300), the start switch comprising independent single-body actuating arms (200), each actuating arm (200) housing at least one conductive blade (300) and pressed against a stop] (220) by a resilient element (400), also comprising a sliding surface (230) equipped with a friction-reduction region (235),
   wherein the conductive blade (300) is housed in a housing (240) of the actuating arm (200) so that it is supported on a biased plane (241) crossing a passage gap (242) and fitting into an anchoring split (243) of said housing (240), and
   wherein the friction-reduction region (235) is cavity-shaped in order to receive materials with a lower friction coefficient than that of contacting components materials reducing the friction coefficient between contacting components.

2. An electric machine, comprising:
   a start switch equipped with a base (100) onto which actuating arms (200) are mounted, housing conductive blades (300), the start switch comprising independent single-body actuating arms (200), each actuating arm (200) housing at least one conductive blade (300) and pressed against a stop (220) by a resilient element (400), also comprising a sliding surface (230) equipped with a friction-reduction region (235),
   wherein the conductive blade (300) is housed in a housing (240) of the actuating arm (200) so that it is supported on a biased plane (241) crossing a passage gap (242) and fitting into an anchoring split (243) of said housing (240), and
   wherein the friction-reduction region (235) is cavity-shaped in order to receive materials with a lower friction coefficient than that of contacting components materials reducing the friction coefficient between contacting components.

* * * * *

UNITED STATES PATENT AND TRADEMARK OFFICE
CERTIFICATE OF CORRECTION

PATENT NO. : 10,978,264 B2
APPLICATION NO. : 16/472698
DATED : April 13, 2021
INVENTOR(S) : Emerson Ricardo Olsson Hopner Page 1 of 1

It is certified that error appears in the above-identified patent and that said Letters Patent is hereby corrected as shown below:

In the Claims

In Column 4, Line 32 (approx.), Claim 1, delete "stop]" and insert -- stop --.

Signed and Sealed this
Twenty-sixth Day of October, 2021

Drew Hirshfeld
*Performing the Functions and Duties of the
Under Secretary of Commerce for Intellectual Property and
Director of the United States Patent and Trademark Office*